United States Patent Office 2,899,851
Patented Aug. 18, 1959

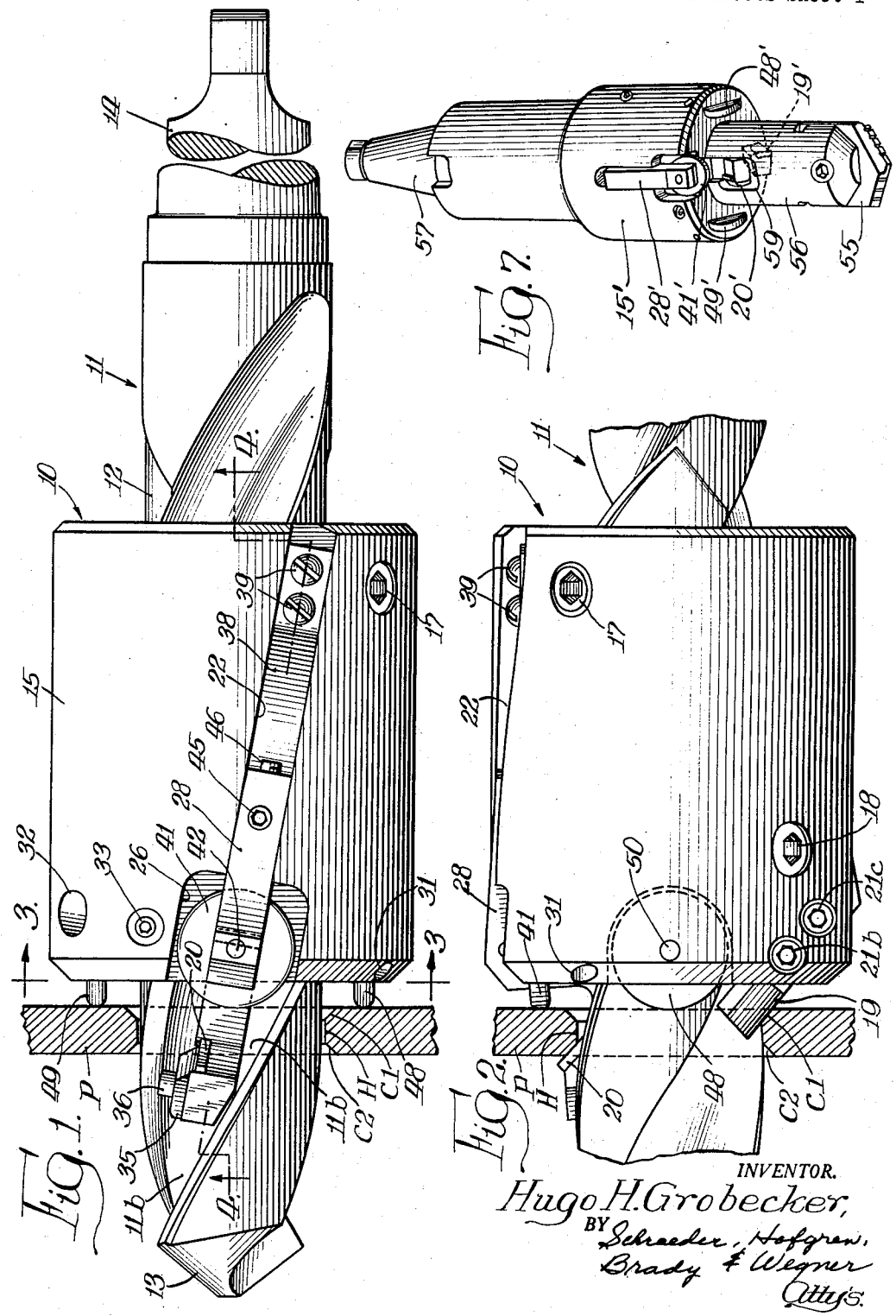

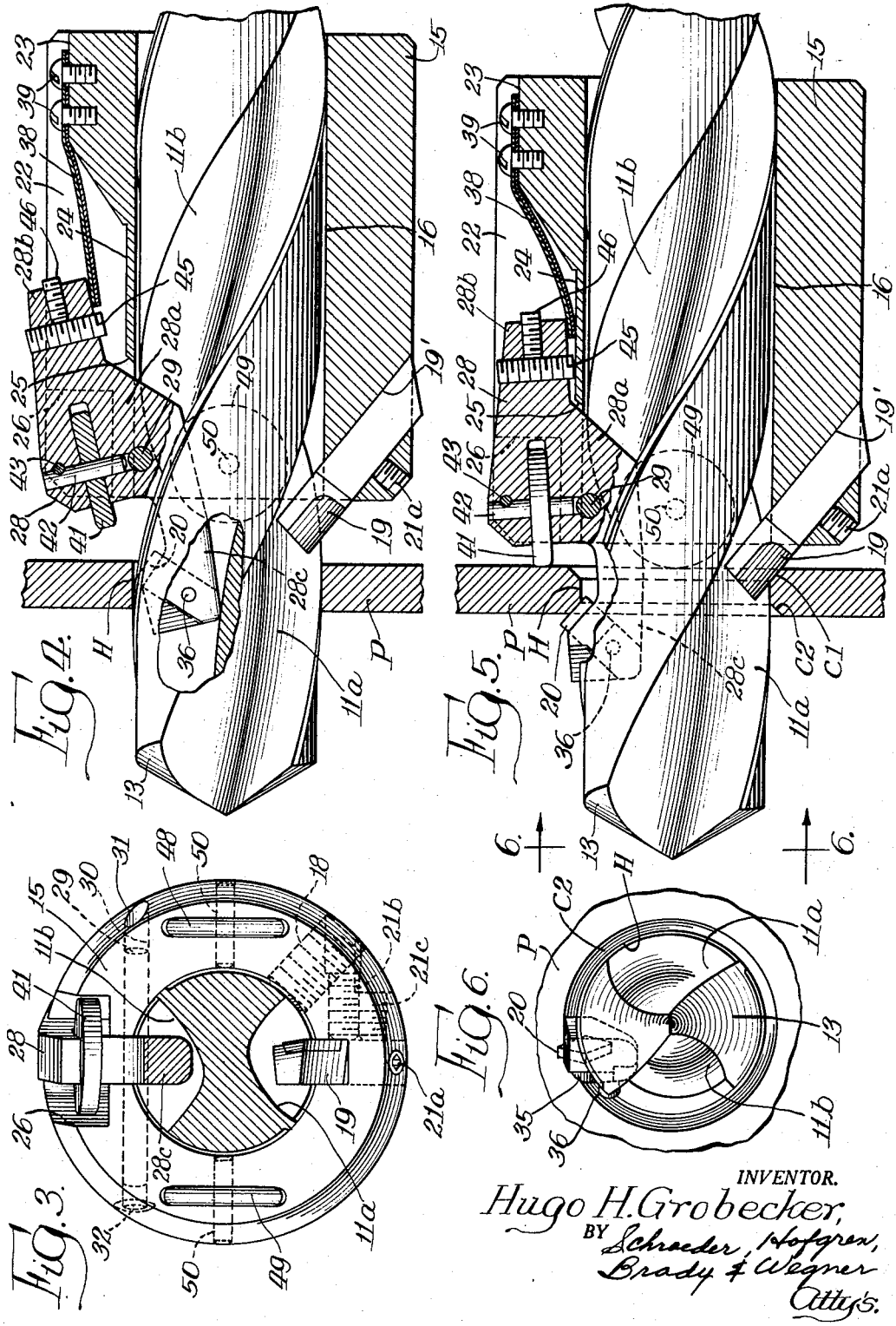

2,899,851

CHAMFERING TOOL

Hugo H. Grobecker, Milwaukee, Wis., assignor to Cleaver-Brooks Company, a corporation of Wisconsin Application May 11, 1956, Serial No. 584,357

8 Claims. (Cl. 77—66)

This invention relates to tools and particularly to tools for chamfering a metal plate about the periphery of a circular hole therethrough.

It is a general object of the invention to provide a new and improved chamfering tool of the character described.

A more specific object is to provide a new and improved chamfering tool including a chamfering bit adapted to be passed from one side of a metal plate through a circular hole in the plate for chamfering the edge of the plate about the periphery of the hole at the opposite side of the plate.

Another object is to provide a new and improved chamfering tool of the character described for chamfering a metal plate about the periphery of a circular hole extending therethrough from one surface of the plate to the opposite surface of the plate including bits for simultaneously chamfering the two edges of the plate at opposite surfaces of the plate.

A further object is to provide a new and improved chamfering tool of the character described in the preceding paragraphs adapted to be attached to a cutting tool for forming a circular hole in a metal plate so that the chamfering tool is effective to chamfer opposite edges of the plate about the periphery of the circular hole formed by the cutting tool all as a part of a single operation.

It is also an object of the invention to provide a new and improved combined drilling and chamfering tool including a drill bit for forming a circular hole in a metal plate and at least one chamfering bit for chamfering the plate about the periphery of the hole formed by the drill bit at the side of the plate opposite that from which the drill bit approaches the plate.

Other objects, features and advantages will become readily apparent from the following detailed description taken in connection with the accompanying drawings in which:

Figure 1 is a broken plan view of a drilling and chamfering tool embodying the principles of the present invention in operative relation to a metal plate shown fragmentarily;

Figure 2 is a fragmentary side elevational view of the combined tool illustrated in Figure 1;

Figure 3 is a vertical sectional view taken at about the line 3—3 of Figure 1;

Figure 4 is a fragmentary sectional view taken at about the line 4—4 of Figure 1, with the combined tool in a different position relative to the plate than that illustrated in Figure 1;

Figure 5 is a fragmentary sectional view similar to that of Figure 4 but with the combined tool positioned relative to the plate as illustrated in Figure 1;

Figure 6 is a fragmentary and elevational view taken at about the line 6—6 of Figure 5; and Figure 7 is a perspective view of another embodiment of the invention.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

Referring now to the drawings, in Figures 1 through 6, I have illustrated a chamfering tool generally designated 10 which may be attached to existing drill bits such as that generally designated 11. The drill bit 11, as illustrated, comprises a two-groove twist drill bit including a shank portion 12, a cutting end 13, and a suitably formed end portion 14 adapted to be secured in a suitable supporting and driving mechanism.

The chamfering tool 10, in the form of an attachment, includes a relatively heavy sleeve or collar 15 having a central cylindrical bore 16 (Figs. 4 and 5) of a size comparable to the outer diameter of the drill bit 11 so that the collar 15 is adapted to be fitted on the drill bit. The collar 15 may be retained in position on the drill bit by means of clamping screws such as those illustrated at 17 and 18, threadably mounted in the collar and adapted to bear against the lands of the twist drill bit when tightened. Obviously, other or additional clamping means may be provided if desired. In the manner described, the collar 15 may be attached to the drill bit for rotation therewith and for movement with the drill bit longitudinally of the axis of rotation toward and away from a metal plate P positioned to be machined by the combined tool illustrated.

The end portion 14 of the drill bit 11 will be mounted in a suitable power mechanism adapted to provide movement of the drill bit toward and away from the metal plate P while the bit is being rotated, in order to form a circular hole such as that illustrated at H in the metal plate. The collar 15 carries a chamfering bit 19 for chamfering the plate P about the periphery of the hole H at the side of the plate P from which the drill bit approaches the plate, the chamfer formed by the bit 19 being illustrated at C1. The collar 15 also carries a movably mounted bit 20 for chamfering plate P about the periphery of the hole H and adjacent the opposite side of the plate from which the drill bit approaches, the chamfer formed by the bit 20 being illustrated at C2.

The chamfering bit 19 is adapted to be received in an angularly extending recess 19' in the collar 15 and retained in position by set screws such as those illustrated at 21a, 21b and 21c. The cutting end of the chamfering bit 19 projects into a spiral groove 11a of the drill bit so as to be properly positioned for engagement with the edge of the plate P about the periphery of the hole H at the side of the plate from which the drill bit approaches.

In order to mount the movable chamfering bit 20, the collar 15 is formed externally with a generally longitudinally extending groove or slot 22 which, as illustrated, includes a relatively shallow portion 23, adjacent the right hand end of the collar as viewed in Figures 4 and 5, which leads to a considerably deeper midportion 24, and at the left end of the collar 15 is cut entirely through the thickness of the collar, as illustrated at 25, to provide access to the interior of the collar. Adjacent the left end of the slot 22, that is, adjacent the cutting end of the drill bit, the slot 22 is widened materially for a portion of its depth to define a recess 26 (Fig. 1), the purpose of which will be explained hereinafter.

An elongated lever 28 is fitted in the slot 22 and pivotally mounted on the collar 15 by means of a pivot pin 29 which extends transversely of the length of the lever and is mounted in a bore 30 extending generally transversely of the collar 15, opposite ends of which bore are illustrated at 31 and 32 in Figures 1 and 3. The pivot pin 29 may be retained in position in the bore 30 by means of a retaining screw illustrated at 33 (Fig. 1).

As seen best in Figure 1, the pivotally mounted lever 28 is of substantially uniform width throughout its length. As seen best in Figures 4 and 5, the thickness or height of the lever 28 is not uniform, the lever being formed with a relatively thick central portion 28a, reduced right end portion 28b, and a reduced left end portion 28c which projects beyond the end of collar 15. The right end portion 28b and the upper part of the midportion 28a are housed in the slot or groove 22 formed in the collar 15. The lower part of the midportion 28a projects radially inwardly of the collar 15 and, with the end portion 28c, is positioned within a spiral groove 11b of the twist drill bit 11. The end of the end portion 28c of the lever 28 is fashioned for mounting the chamfering bit 20 which may be retained in position on the lever by means of a clamping plate 35 (Figs. 1 and 6) and a clamping screw 36. The longitudinal axis of the lever 28 is somewhat inclined relative to the axis of the drill bit (as seen in Fig. 1), so that the end portion 28c of the lever may be suitably positioned in the groove 11b which spirals about the axis of the drill bit.

The lever 28 supports the chamfering bit 20 for movement between a first radially inward position relative to the axis of the drill bit wherein the chamfering bit is adapted to pass through the hole H in the plate P without engaging the plate, as illustrated in Figure 4, and a second radially outward position relative to the axis of the drill bit wherein the chamfering bit will engage the edge of the plate P about the periphery of the hole H adjacent the side of the plate P opposite the side from which the drill bit approaches the plate, as illustrated in Figures 2 and 5 to form the chamfer C2.

The lever 28 is biased by spring means to normally dispose the chamfering bit 20 in the radially inward position illustrated in Figure 4. As illustrated herein, the spring means acting on the lever 28 includes a flat leaf spring member 38 secured to the collar 15 in the groove 22 by means of screws 39. The free end of the leaf spring member 38 engages the underside of the end portion 28b of the lever 28 to normally maintain the lever in the position illustrated in Figure 4.

The lever 28 may be pivoted to the position illustrated in Figure 5 by means of a part carried by the lever 28 and engageable with the metal plate P as the collar 15 approaches the plate. As illustrated herein, the part carried by the lever 28 for engagement with the plate P to pivot the lever comprises a roller 41 supported on the lever by means of a pin 42, the pin 42 being retained in position in the lever 28 by means of a locking pin 43 (Figs. 4 and 5). The roller 41 is received in the enlarged portion 26 of the groove 22 in the collar 15. It should be apparent that as the collar approaches the plate P from the position illustrated in Figure 4, the roller 14 on the rotating collar 15 will engage the plate P to pivot the lever to the position illustrated in Figure 5.

Pivotal movement of the lever 28 against the urge of the spring 38 may be limited by means of an adjustable stop screw 45 carried by the end portion 28b of the lever and adapted to engage with the collar 15 at the bottom of the deepened midportion 24 of the groove 22. The stop screw 45 may be retained in adjusted position by means of a set screw 46. Engagement of the stop screw 45 with the collar 15 is effective to limit pivotal movement of the lever 28 to thereby determine the movement of the chamfering bit 20 to properly position the bit to form the desired chamfer C2. It will be appreciated that engagement of the stop screw 45 with the collar 15 is also effective to limit movement of the collar 15 toward the plate P to thereby also control the ultimate position of the chamfering bit 19.

The face of the collar 15 adjacent the metal plate P is also provided with stop means engageable with the plate P and effective thereby to limit movement of the collar 15 toward the plate P. As illustrated, such stop means comprises a pair of stop rollers 48 and 49 supported at diametrically opposite positions on the collar by means of pins 50 suitably retained in the collar. It will be appreciated that engagement of the rollers 48 and 49 with plate P is also effective to limit pivotal movement of the lever 28, and is thus effective also to control the ultimate positions of the chamfering bits 19 and 20.

It is believed that operation of the device to effect movement of the chamfering bit 20 to the position illustrated in Figure 5 will be understood from the description above. It will be appreciated that on retraction of the drill bit 11 and collar 15 away from the plate P, the roller 14 is also moved away from the plate P and the spring 38 is effective to automatically return the chamfering bit 20 to the position illustrated in Figure 4. The chamfering tool attachment illustrated is effective to simultaneously chamfer both edges of the plate P about the hole formed by the drill bit on which the chamfering tool is mounted, so that the drilling and chamfering are accomplished in a single operation in an accurate and efficient manner. It should be understood that the chamfering tool is not necessarily limited to use with a twist drill bit, but may be utilized with other elements for forming a circular hole in a metal plate. Also, it should be understood that the chamfering tool base or support, such as collar 15, need not necessarily be removable and attachable but may be integral with the element for forming the hole H.

In Figure 7 I have illustrated a modification of a combined drilling and chamfering tool. In this modification, the chamfering tool is illustrated in connection with a spade drill including a flat drill bit 55 removably carried at one end of a shank 56 having its opposite end portion 57 adapted to be suitably connected to a suitable support for rotating the shank and effecting reciprocal movement thereof along its axis. As illustrated, a collar 15' is integrally formed on the shank 56 for supporting a stationarily mounted chamfering bit 19' and a movably mounted chamfering bit 20'. Inasmuch as the shank 56 is not formed with flutes or grooves in a manner similar to the twist drill 11 of Figures 1 through 6, the shank 56 may be provided with a suitable recess 59 for receiving the pivotally mounted lever 28' carrying the chamfering bit 20', and with a suitable recess for receiving the projecting, cutting end of the fixedly mounted chamfering bit 19. Since the recess 59 formed in the shank 56 need not be spirally arranged as is the groove 11b of the twist drill 11, the longitudinal axis of the pivotal lever 28' need not be inclined relative to the axis of the shank 56. Operation and construction of the combined drilling and chamfering tool illustrated in Figure 7 may otherwise be similar to that described in connection with the modification of Figures 1 through 6. It will be appreciated that the collar 15' need not necessarily be integral with the shank 56, but may be removably attachable as is the collar 15 in Figures 1 through 6.

I claim:

1. In combination with a rotatable twist drill bit for forming a circular hole through a metal plate, a chamfering tool for chamfering the plate about the periphery of the hole formed by the drill bit, comprising, a part fixed on the drill bit for rotation therewith and for movement therewith along the axis of rotation toward and away from the plate and a level pivotally mounted on said part and having one end portion adapted to support a chamfering bit, said lever extending generally longitudinally of said axis and inclined thereto at an angle conforming generally to the twist of the drill bit so that the lever is positioned with said one end portion in a flute of the twist drill bit for movement about its pivot generally radially toward and away from said axis between a first, radially inward position within the periphery of the drill bit wherein said chamfering bit will pass from one side of the plate through the hole formed in the plate by the drill bit without engaging the plate and a second, radially outward position wherein the chamfering bit will engage the edge of the plate about the periphery of the hole at the opposite side of the plate when the bit has passed substantially through the hole.

2. A chamfering tool attachment for use with a drill bit to chamfer a metal plate about the periphery of a circular hole formed through the plate by a drill bit, comprising, a sleeve adapted to be detachably fitted on the shank of the drill bit, means on the sleeve for securing the sleeve on the bit including at least one lock member movable on the sleeve between a first position engageable with the bit to releasably fix the sleeve on the bit for movement therewith and a second position disengaging the bit to enable movement of the sleeve onto or off of the bit, a lever pivotally mounted solely on the sleeve and unconnected with the drill bit, said lever having one end extending outwardly from the sleeve adapted for carrying a chamfering bit and for movement about its pivot generally radially toward and away from the axis of the sleeve between a first, radially inward position wherein the chamfering bit will pass from one side of the plate through the hole in the plate and a second, radially outward position wherein the bit will engage the plate about the periphery of the hole at the opposite side of the plate, spring means acting against the sleeve and the lever to normally maintain said one end of the lever in said first position, and means for rocking the lever against the urge of the spring means to said second position.

3. A chamfering tool for use with a drill bit to chamfer a metal plate about the periphery of a circular hole formed through the plate by the drill bit, comprising, a sleeve adapted to be fixedly secured to the shank of the drill bit for movement therewith, a lever pivotally mounted on the sleeve and having one end extending therefrom adapted for carrying a chamfering bit and for movement about its pivot generally radially toward and away from the axis of the sleeve between a first radially inward position wherein the chamfering bit will pass from one side of the plate through the hole in the plate and a second radially outward position wherein the bit will engage the plate about the periphery of the hole at the opposite side of the plate, spring means acting against the sleeve and the lever to normally maintain said one end of the lever in said first position, a part carried by the lever for engagement with the plate to pivot the lever to move said one end of the lever toward said second position, cooperating stop means on the sleeve and on the lever for limiting movement of the lever toward said second position, a second chamfering bit carried by said sleeve for engagement with the edge of the plate about the periphery of the hole adjacent said one side of the plate, and stop members mounted on said sleeve for engagement with the plate to limit movement of the sleeve toward the plate.

4. A chamfering tool for use in chamfering a plate about the periphery of an opening through the plate, comprising, a cylindrically shaped tool body rotatable about its longitudinal axis and adapted for movement along said axis toward and away from the plate, said tool body being formed with a slot extending generally longitudinally thereof, a lever fitted in said slot and having a midportion pivotally mounted on the tool body, one end portion of the lever projecting axially of the tool body from said pivotal mounting and being adapted to carry a chamfering bit thereby adapted for movement about the lever pivot between a retracted, radially inner position permitting movement of the bit from one face of the plate through the opening in the plate and radially outer, operative positions wherein the bit is engageable with the plate edge about the periphery of the opening at the opposite face of the plate, spring means positioned in said slot between the tool body and said lever and yieldably urging the lever to the retracted position, a bearing member rotatably mounted on said lever and engageable with said plate for rocking the lever to move the chamfering bit into operative positions in opposition to said spring means, and said lever and said slot being relatively proportioned so that in all positions of the lever said bearing member and substantially all portions of the lever are disposed radially inwardly relative to the periphery of the tool body.

5. A combination drilling and chamfering tool for forming an opening in a metal plate or the like and chamfering a plate edge about the opening in a single operation, comprising, a rotatable drill element movable longitudinally of its axis toward and away from the plate, a collar fixed on said element spaced from its cutting end, a lever pivoted on the collar and having one end portion formed to support a chamfering bit, said one end portion extending generally longitudinally of the drill element toward said cutting end and positioned in a recess in the shank of the drill element for movement about the lever pivot between a first, radially inward, retracted position within the effective drilling circumference of the drill element and a second, radially outward, operative position outside the effective drilling circumference of the drill element to dispose a chamfering bit carried thereby for engagement with the plate edge about the opening formed by the drill element at the face of the plate opposite that approached by the tool, means normally retaining the lever yieldably in the first position, and a bearing member rotatably carried by the lever eccentrically of the lever pivot and engageable with the plate face approached by the tool as the tool approaches the plate thereby to pivot the lever to the second position.

6. A chamfering tool attachment for use with a twist drill bit to chamfer a metal plate or the like about the periphery of an opening formed in the plate by the drill bit, comprising, a collar adapted to be fitted on the shank of a drill bit, means carried by the collar for securing the same fixedly to the drill bit for movement therewith, a lever pivoted on the collar and having one end portion adapted to support a chamfering bit, said end portion extending generally longitudinally of said collar and being inclined thereto at an angle to conform generally to the twist of a twist drill bit, said end portion of the lever extending axially from one end of the sleeve to project into a flute of a drill bit and being mounted for movement about the lever pivot between a first position disposed radially inwardly relative to the inner periphery of the collar and a second position disposed radially outwardly relative to the inner periphery of the collar, means carried by the collar normally retaining said lever yieldably in said first position, and means carried by the lever for engagement with a workpiece to pivot the lever to said second position.

7. In combination, a tool for forming a hole in a plate or the like and chamfering a plate edge about the hole as part of a single operation, comprising, a rotatable metal cutting tool for forming a circular hole through a metal plate, a part fixed on the metal cutting tool for movement therewith, a lever pivotally mounted on said part, one end of the lever being adapted for carrying a chamfering bit and for movement about its pivot inwardly and outwardly relative to the rotary axis of the metal cutting tool between a first inner position wherein said bit will pass from one side of the plate through the hole formed in the plate by said cutting tool and a second outer position wherein the bit will engage the edge of the plate about the periphery of the hole at the opposite side of the plate, spring means acting between said part and said lever and biasing said one end toward said first position, and means on the lever engageable with said plate as said cutting tool passes through said plate in forming said hole to pivot said lever to said second position wherein said bit engages said plate edge as the cutting tool passes through the plate in a hole forming direction.

8. In combination with a rotatable drill bit for forming a circular hole through a metal plate, a chamfering tool for chamfering the plate about the periphery of the hole, comprising, a part fixed on the drill bit for rotation therewith and for movement therewith along the axis of rotation toward and away from the plate, a lever pivotally mounted on said part, one end of the lever being adapted for carrying a first chamfering bit and positioned in a recess in the shank of the drill bit for movement about its pivot generally radially toward and away from said axis between a first, radially inward position wherein said chamfering bit will pass from one side of the plate through the hole formed in the plate by the drill bit without engaging the plate and a second, radially outward position wherein the chamfering bit will engage the edge of the plate about the periphery of the hole at the opposite side of the plate, stop means on said part engageable with said plate to limit movement of said drill bit through said plate in a hole forming direction, a second chamfering bit fixedly secured on said part and engageable with the plate edge about the periphery of the hole at said one side of the plate, spring means acting against said part and said lever and biasing said one end of the lever toward said first position, and means on the lever engageable with said plate as said drill bit passes through said plate in forming said hole to pivot said lever to said second position wherein said first chamfering bit engages said plate edge as the drill bit passes through the plate in a hole forming direction.

References Cited in the file of this patent

UNITED STATES PATENTS

| | | |
|---|---|---|
| 1,568,056 | Butz | Jan. 5, 1926 |
| 2,340,941 | Dietz | Feb. 8, 1944 |
| 2,663,203 | Fried et al. | Dec. 22, 1953 |

FOREIGN PATENTS

| | | |
|---|---|---|
| 118,177 | Great Britain | Aug. 22, 1918 |
| 579,528 | Great Britain | Aug. 7, 1946 |